(12) United States Patent
Chung et al.

(10) Patent No.: US 12,479,469 B2
(45) Date of Patent: Nov. 25, 2025

(54) DECIDING SYSTEM FOR MOVING VEHICLE ON VIRTUAL RAIL AND METHOD THEREOF

(71) Applicant: Automotive Research & Testing Center, Changhua County (TW)

(72) Inventors: Kuo-Chen Chung, Changhua County (TW); Hsien-Chang Chiu, Changhua County (TW); Kuan-Ying Su, Changhua County (TW); Ming-Kuan Ko, Changhua County (TW); Po-Han Lu, Changhua County (TW)

(73) Assignee: Automotive Research & Testing Center, Changhua County (TW)

( * ) Notice: Subject to any disclaimer, the term of this patent is extended or adjusted under 35 U.S.C. 154(b) by 147 days.

(21) Appl. No.: 18/516,956

(22) Filed: Nov. 22, 2023

(65) Prior Publication Data
US 2025/0162610 A1    May 22, 2025

(51) Int. Cl.
*B60W 60/00* (2020.01)
*B60R 16/023* (2006.01)
(Continued)

(52) U.S. Cl.
CPC ....... *B60W 60/001* (2020.02); *B60R 16/0231* (2013.01); *B60W 40/12* (2013.01);
(Continued)

(58) Field of Classification Search
CPC .... B60W 60/001; B60W 40/12; B60W 50/00; B60W 2050/0083; B60W 2300/00;
(Continued)

(56) References Cited

U.S. PATENT DOCUMENTS 4,357,593 A * 11/1982 von Tomkewitsch ...................... G08G 1/096811
340/988
4,817,000 A * 3/1989 Eberhardt ............ G05D 1/0272
701/25
(Continued)

FOREIGN PATENT DOCUMENTS

CN     107091637 A     8/2017
CN     107393301 A *  11/2017 ........... G08G 1/0125
(Continued)

OTHER PUBLICATIONS

"Autonomous Convoying: A Survey on Current Research and Development;" Nahavandi et al., IEEE Access (vol. 10, 2022, pp. 13663-13683); Jan. 1, 2022. (Year: 2022).*
(Continued)

*Primary Examiner* — Khoi H Tran
*Assistant Examiner* — Jorge O Peche
(74) *Attorney, Agent, or Firm* — CKC & Partners Co., LLC

(57) ABSTRACT

A deciding system for moving a vehicle on a virtual rail is configured to decide a moving trajectory of the vehicle on a road, and includes a positioning module, a vehicle dynamic detecting module and a calculating-deciding module. A wireless tag device is configured to generate a tag message. A magnetic device is configured to generate a magnetic sensing message. The vehicle dynamic detecting module is disposed on the vehicle and configured to generate a vehicle dynamic message corresponding to the vehicle. The calculating-deciding module is signally connected to the positioning module and the vehicle dynamic detecting module. The calculating-deciding module receives the magnetic sensing message, the tag message and the vehicle dynamic message. The calculating-deciding module calculates a deviation value between the magnetic sensing message and
(Continued)

the vehicle dynamic message, and decides the moving trajectory of the vehicle according to the tag message and the deviation value.

12 Claims, 11 Drawing Sheets

(51) Int. Cl.
  *B60W 40/12* (2012.01)
  *B60W 50/00* (2006.01)
  *G08G 1/01* (2006.01)

(52) U.S. Cl.
  CPC ........... *B60W 50/00* (2013.01); *G08G 1/0116* (2013.01); *G08G 1/0125* (2013.01); *G08G 1/0141* (2013.01); *B60W 2050/0083* (2013.01); *B60W 2300/00* (2013.01); *B60W 2520/06* (2013.01); *B60W 2554/20* (2020.02)

(58) Field of Classification Search
  CPC .......... B60W 2520/06; B60W 2554/20; B60R 16/0231; G08G 1/0116; G08G 1/0125; G08G 1/0141
  See application file for complete search history.

(56) References Cited

U.S. PATENT DOCUMENTS

| | | | | |
|---|---|---|---|---|
| 5,512,904 | A * | 4/1996 | Bennett | G01C 21/28 701/472 |
| 6,019,184 | A * | 2/2000 | Nagai | G05D 1/0261 701/49 |
| 6,378,772 | B1 * | 4/2002 | Yonemura | G08G 1/096758 235/449 |
| 6,580,978 | B1 * | 6/2003 | McTamaney | G01C 21/188 701/417 |
| 9,168,924 | B2 * | 10/2015 | Lee | B60W 50/04 |
| 10,000,222 | B2 * | 6/2018 | Allshouse | B61L 1/14 |
| 11,912,318 | B2 * | 2/2024 | Garmson | H04L 67/12 |
| 2002/0065600 | A1 * | 5/2002 | Oka | G08G 1/042 340/988 |
| 2002/0143442 | A1 * | 10/2002 | Uehara | G01C 21/28 318/587 |
| 2008/0136675 | A1 * | 6/2008 | Kim | G08G 1/161 340/935 |
| 2008/0303717 | A1 * | 12/2008 | Durban | G01S 1/44 342/371 |
| 2010/0141483 | A1 * | 6/2010 | Thacher | G01S 13/931 340/989 |
| 2011/0193723 | A1 * | 8/2011 | Qin | E01F 11/00 340/941 |
| 2012/0035844 | A1 * | 2/2012 | Ono | B60W 30/12 427/550 |
| 2012/0197464 | A1 * | 8/2012 | Wang | G05D 1/0038 701/28 |
| 2013/0332018 | A1 * | 12/2013 | Kim | G05D 1/0238 701/25 |
| 2013/0345895 | A1 * | 12/2013 | Reynolds | G07C 5/0816 701/1 |
| 2017/0043797 | A1 * | 2/2017 | Allshouse | B61L 25/025 |
| 2017/0261369 | A1 * | 9/2017 | Yan | G05D 1/0242 |
| 2018/0301027 | A1 * | 10/2018 | Taylor | H04L 67/12 |
| 2019/0103023 | A1 * | 4/2019 | McNew | G08G 1/0962 |
| 2019/0155305 | A1 | 5/2019 | Yamamoto et al. | |
| 2019/0196496 | A1 * | 6/2019 | Yamamoto | B62D 15/0295 |
| 2020/0012294 | A1 * | 1/2020 | Yamamoto | E01C 23/18 |
| 2020/0133299 | A1 * | 4/2020 | Yamamoto | G05D 1/027 |
| 2020/0209868 | A1 * | 7/2020 | Fischer | G01S 5/0289 |
| 2020/0314592 | A1 * | 10/2020 | Dunn, Jr. | H04W 4/026 |
| 2020/0320870 | A1 * | 10/2020 | Yamamoto | G08G 1/042 |
| 2020/0332483 | A1 * | 10/2020 | Michiharu | G05D 1/0261 |
| 2020/0340825 | A1 * | 10/2020 | Yamamoto | G01C 21/3679 |
| 2020/0379062 | A1 * | 12/2020 | Ho | G01C 21/08 |
| 2021/0027631 | A1 * | 1/2021 | Ye | G01S 1/20 |
| 2021/0029500 | A1 * | 1/2021 | Ye | H04W 4/029 |
| 2021/0078621 | A1 * | 3/2021 | Garmson | B61L 25/023 |
| 2021/0101497 | A1 * | 4/2021 | Schmitt | G05D 1/0225 |
| 2021/0165419 | A1 * | 6/2021 | Yamamoto | B62D 1/28 |
| 2021/0190939 | A1 * | 6/2021 | Kim | G01S 1/44 |
| 2022/0297683 | A1 * | 9/2022 | Gupta | B60W 30/09 |
| 2022/0412769 | A1 * | 12/2022 | Yamamoto | G01C 21/3815 |
| 2023/0003530 | A1 * | 1/2023 | Yamamoto | G08G 1/042 |
| 2023/0202765 | A1 * | 6/2023 | Kim | H04W 24/10 700/230 |
| 2023/0422193 | A1 * | 12/2023 | Ye | H04W 56/0015 |
| 2024/0171944 | A1 * | 5/2024 | Hollar | H01M 10/46 |
| 2024/0185711 | A1 * | 6/2024 | Urakawa | G08G 1/042 |
| 2024/0302842 | A1 * | 9/2024 | Urakawa | G05D 1/646 |
| 2025/0050903 | A1 * | 2/2025 | Beckwith | B60W 40/04 |
| 2025/0162610 | A1 * | 5/2025 | Chung | G08G 1/0116 |

FOREIGN PATENT DOCUMENTS

| | | | | |
|---|---|---|---|---|
| CN | 109074732 A | * | 12/2018 | ........ B60W 60/0015 |
| CN | 110888426 A | * | 3/2020 | ............ G06F 16/29 |
| CN | 106249736 B | | 5/2020 | |
| CN | 111210622 A | * | 5/2020 | ........... G08G 1/0969 |
| CN | 115699017 A | | 2/2023 | |
| EP | 4063791 A1 | * | 9/2022 | ........ G01C 21/3878 |
| EP | 3802256 B1 | * | 5/2025 | ........ B60W 50/0097 |
| EP | 3904991 B1 | * | 5/2025 | ............ G05D 1/244 |
| JP | H06162393 A | * | 6/1994 | |
| JP | 3401885 B2 | * | 4/2003 | |
| JP | 2008242721 A | * | 10/2008 | |
| KR | 20110105926 A | * | 9/2011 | ............. B25J 13/08 |
| KR | 20230163451 A | * | 11/2023 | ............ G01C 21/28 |
| WO | WO-2019037939 A1 | * | 2/2019 | ............. H04W 4/38 |
| WO | WO-2020138471 A1 | * | 7/2020 | ............ B60W 30/10 |
| WO | WO-2022112909 A1 | * | 6/2022 | ........ G08G 1/09675 |

OTHER PUBLICATIONS

"A Reliable Sensor Network Infrastructure for Electric Vehicles to Enable Dynamic Wireless Charging Based on Machine Learning Technique;" Adil et al.; IEEE Access (vol. 8, 2020, pp. 187933-187947); Jan. 1, 2020. (Year: 2020).*

"Passing Vehicle Road Occupancy Detection Using the Magnetic Sensor Array;" Balamutas et al.; IEEE Access (vol. 11, 2023, pp. 50984-50993); Jan. 1, 2023. (Year: 2023).*

* cited by examiner

DECIDING SYSTEM FOR MOVING VEHICLE ON VIRTUAL RAIL AND METHOD THEREOF

BACKGROUND

Technical Field

The present disclosure relates to a deciding system for moving a vehicle and a method thereof. More particularly, the present disclosure relates to a deciding system for moving a vehicle on a virtual rail and a method thereof.

Description of Related Art

Presently, conventional positioning technologies on the market (e.g., real time kinematic (RTK) and simultaneous localization and mapping (SLAM)) are susceptible to the impact of environment or poor weather and are prone to unstable positioning and accuracy problems, thus leading to excessive tracking errors. Furthermore, conventional technologies on the market of a virtual rail mainly utilize image tracking based on road markings and are supplemented by magnetic guiding technologies or wireless network positioning. These conventional technologies are operated in various local areas. In addition, current researches mainly focus on traveling along fixed routes and requirement of the laying of special rails or power lines, so that the laying of a large number of auxiliary apparatuses is required (e.g., signal transmission devices on the road or radio frequency devices around the lane) to lead to high cost of the laying. Therefore, a deciding system for moving a vehicle on a virtual rail and a method thereof which are capable of not being easily affected by weather, achieving controllable tracking and reducing the cost of the laying are commercially desirable.

SUMMARY

According to one aspect of the present disclosure, a deciding system for moving a vehicle on a virtual rail is configured to decide a moving trajectory of the vehicle on a road, and the deciding system for moving the vehicle on the virtual rail includes a positioning module, a vehicle dynamic detecting module and a calculating-deciding module. The positioning module includes a wireless tag device and a magnetic device. The wireless tag device is configured to generate a tag message. The magnetic device is configured to generate a magnetic sensing message. The vehicle dynamic detecting module is disposed on the vehicle and configured to generate a vehicle dynamic message corresponding to the vehicle. The calculating-deciding module is disposed on the vehicle and signally connected to the positioning module and the vehicle dynamic detecting module. The calculating-deciding module receives the magnetic sensing message, the tag message and the vehicle dynamic message. The calculating-deciding module calculates a deviation value between the magnetic sensing message and the vehicle dynamic message, and decides the moving trajectory of the vehicle according to the tag message and the deviation value.

According to another aspect of the present disclosure, a deciding method for moving a vehicle on a virtual rail is configured to decide a moving trajectory of the vehicle on a road, and the deciding method for moving the vehicle on the virtual rail includes performing a magnetic sensing step, a tag sensing step, a vehicle dynamic sensing step and a calculating-deciding step. The magnetic sensing step includes configuring a magnetic receiving device of a magnetic device to sense at least one magnetic apparatus to generate a magnetic sensing message. The tag sensing step includes configuring a wireless receiving device of a wireless tag device to sense at least one wireless tag to generate a tag message. The vehicle dynamic sensing step includes configuring a vehicle dynamic detecting module to sense the vehicle to generate a vehicle dynamic message corresponding to the vehicle. The calculating-deciding step includes configuring a calculating-deciding module to calculate a deviation value between the magnetic sensing message and the vehicle dynamic message, and decide the moving trajectory of the vehicle according to the tag message and the deviation value. The at least one wireless tag and the at least one magnetic apparatus are disposed on the road, and the wireless receiving device, the magnetic receiving device, the vehicle dynamic detecting module and the calculating-deciding module are disposed on the vehicle.

BRIEF DESCRIPTION OF THE DRAWINGS

The present disclosure can be more fully understood by reading the following detailed description of the embodiment, with reference made to the accompanying drawings as follows.

DETAILED DESCRIPTION

The embodiment will be described with the drawings. For clarity, some practical details will be described below.

However, it should be noted that the present disclosure should not be limited by the practical details, that is, in some embodiment, the practical details are unnecessary. In addition, for simplifying the drawings, some conventional structures and elements will be simply illustrated, and repeated elements may be represented by the same labels.

It will be understood that when an element (or unit, module) is referred to as be "connected to" another element, it can be directly connected to the other element, or it can be indirectly connected to the other element, that is, intervening elements may be present. In contrast, when an element is referred to as be "directly connected to" another element, there are no intervening elements present. In addition, the terms first, second, third, etc. are used herein to describe various elements or components, these elements or components should not be limited by these terms. Consequently, a first element or component discussed below could be termed a second element or component.

Figure 1:
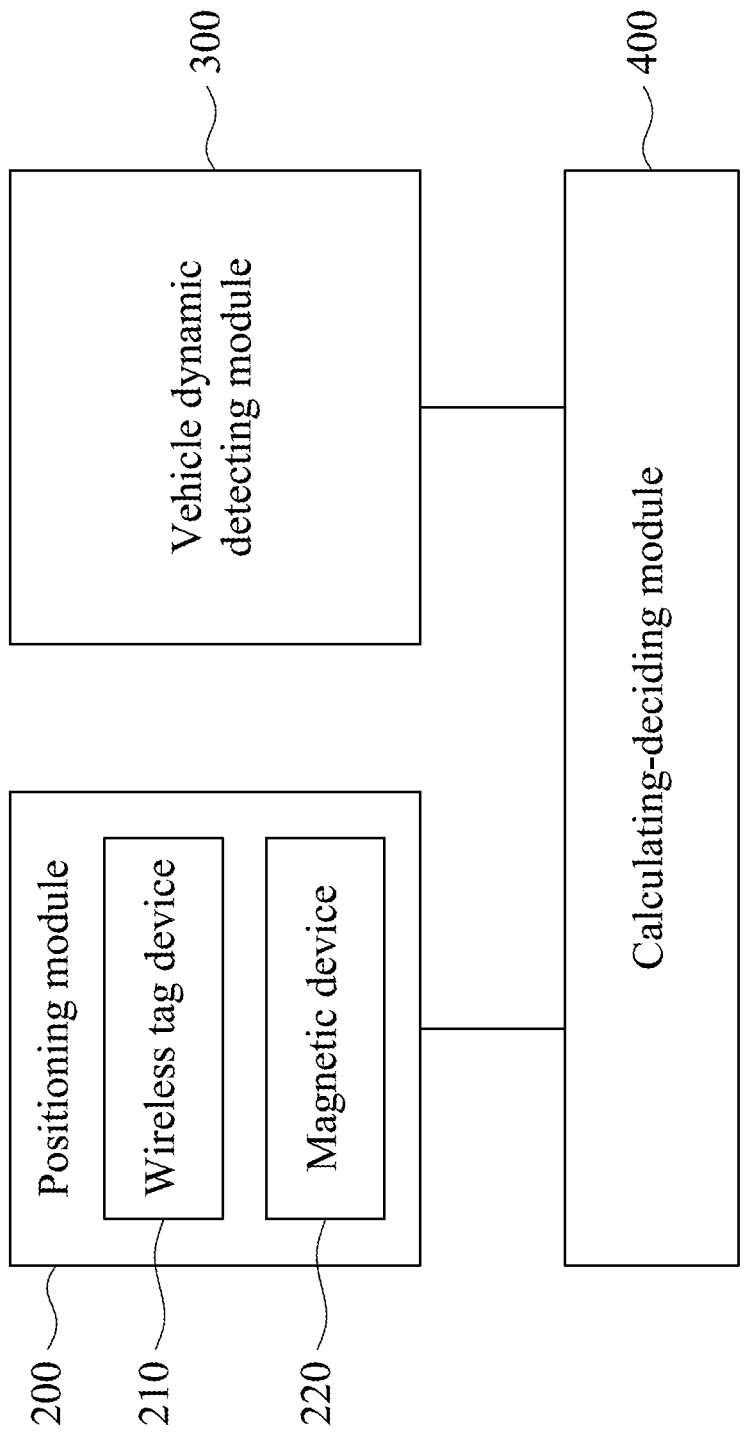
FIG. 1 shows a schematic view of a deciding system for moving a vehicle on a virtual rail according to a first embodiment of the present disclosure.

Reference is made to FIG. 1. FIG. 1 shows a schematic view of a deciding system 100 for moving a vehicle on a virtual rail according to a first embodiment of the present disclosure. The deciding system 100 for moving the vehicle on the virtual rail is configured to decide a moving trajectory of the vehicle on a road, and includes a positioning module 200, a vehicle dynamic detecting module 300 and a calculating-deciding module 400. The positioning module 200 includes a wireless tag device 210 and a magnetic device 220. The wireless tag device 210 is configured to generate a tag message. The magnetic device 220 is configured to generate a magnetic sensing message. The vehicle dynamic detecting module 300 is disposed on the vehicle and configured to generate a vehicle dynamic message corresponding to the vehicle. The calculating-deciding module 400 is disposed on the vehicle and signally connected to the positioning module 200 and the vehicle dynamic detecting module 300. The calculating-deciding module 400 receives the magnetic sensing message, the tag message and the vehicle dynamic message. The calculating-deciding module 400 calculates a deviation value between the magnetic sensing message and the vehicle dynamic message, and decides the moving trajectory of the vehicle according to the tag message and the deviation value.

Figure 2:
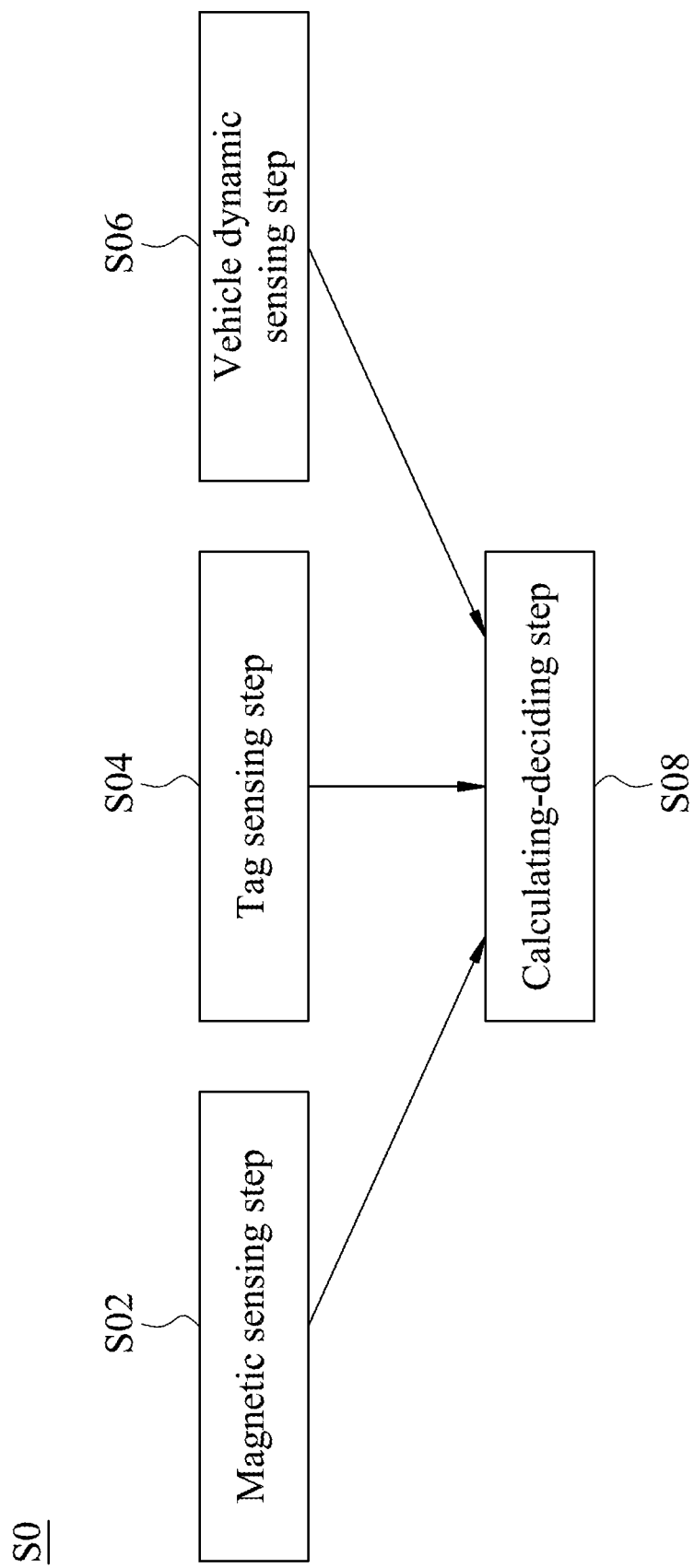
FIG. 2 shows a flow chart of a deciding method for moving a vehicle on a virtual rail according to a second embodiment of the present disclosure.

Reference is made to FIGS. 1 and 2. FIG. 2 shows a flow chart of a deciding method S0 for moving a vehicle on a virtual rail according to a second embodiment of the present disclosure. The deciding method S0 for moving the vehicle on the virtual rail may be applied to the deciding system 100 for moving the vehicle on the virtual rail, and configured to decide a moving trajectory of the vehicle on a road. The deciding method S0 for moving the vehicle on the virtual rail includes performing a magnetic sensing step S02, a tag sensing step S04, a vehicle dynamic sensing step S06 and a calculating-deciding step S08. The magnetic sensing step S02 includes configuring a magnetic receiving device (not shown) of a magnetic device 220 to sense at least one magnetic apparatus (not shown) to generate a magnetic sensing message. The tag sensing step S04 includes configuring a wireless receiving device (not shown) of a wireless tag device 210 to sense at least one wireless tag (not shown) to generate a tag message. The vehicle dynamic sensing step S06 includes configuring a vehicle dynamic detecting module 300 to sense the vehicle to generate a vehicle dynamic message corresponding to the vehicle. The calculating-deciding step S08 includes configuring a calculating-deciding module 400 to calculate a deviation value between the magnetic sensing message and the vehicle dynamic message, and decide the moving trajectory of the vehicle according to the tag message and the deviation value. The at least one wireless tag and the at least one magnetic apparatus are disposed on the road. The wireless receiving device, the magnetic receiving device, the vehicle dynamic detecting module 300 and the calculating-deciding module 400 are disposed on the vehicle.

Therefore, the deciding system 100 and the deciding method S0 for moving the vehicle on the virtual rail of the present disclosure can perform tracking control via a distance estimation between tags, a magnetic nail navigation correcting method and a trajectory prediction, thereby not only effectively correcting a yaw condition during traveling so as to achieve controllable tracking but also reducing the number of magnetic nails and the cost of laying the magnetic nails.

Figure 3:
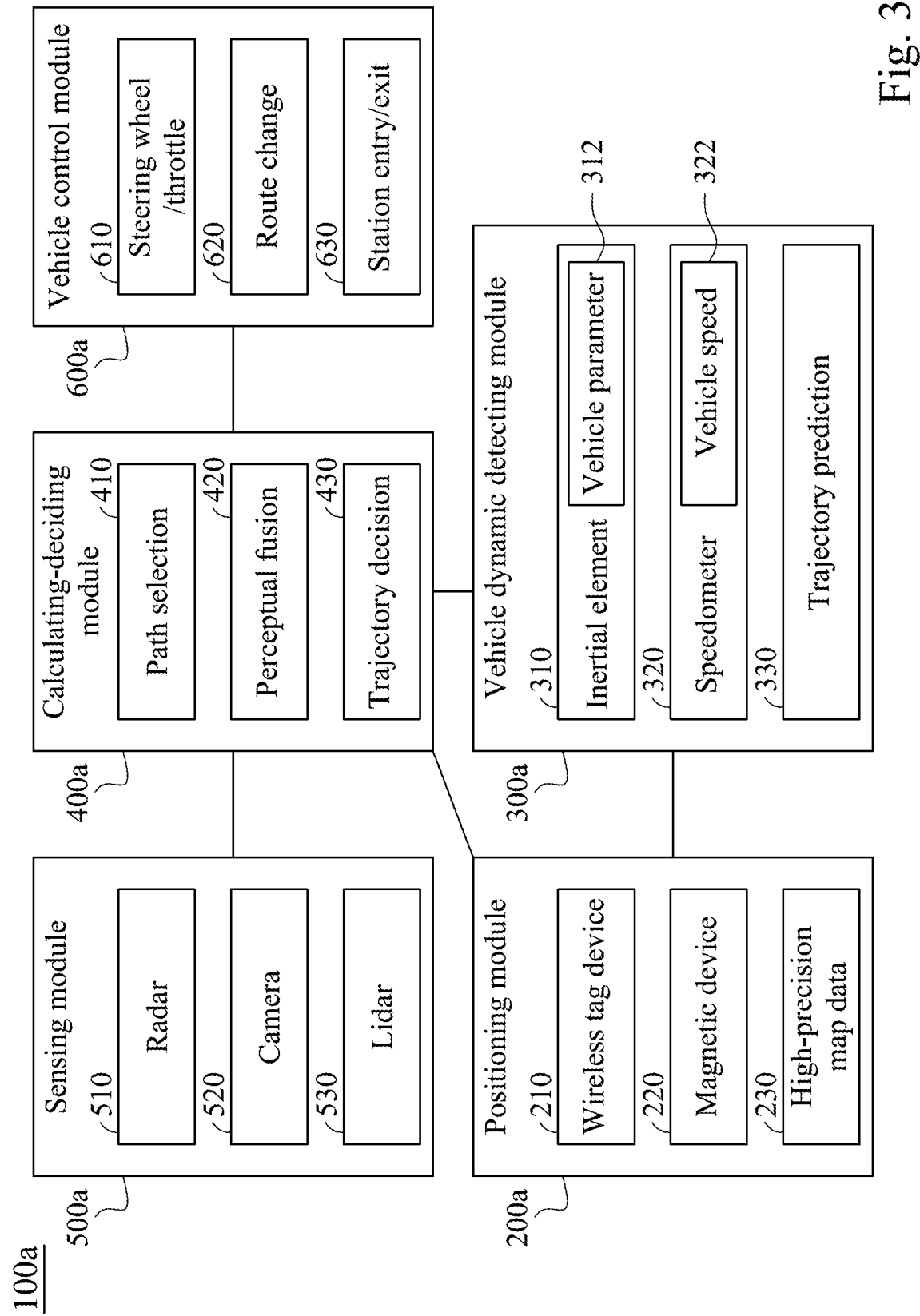
FIG. 3 shows a schematic view of a deciding system for moving a vehicle on a virtual rail according to a third embodiment of the present disclosure.
Figure 4:
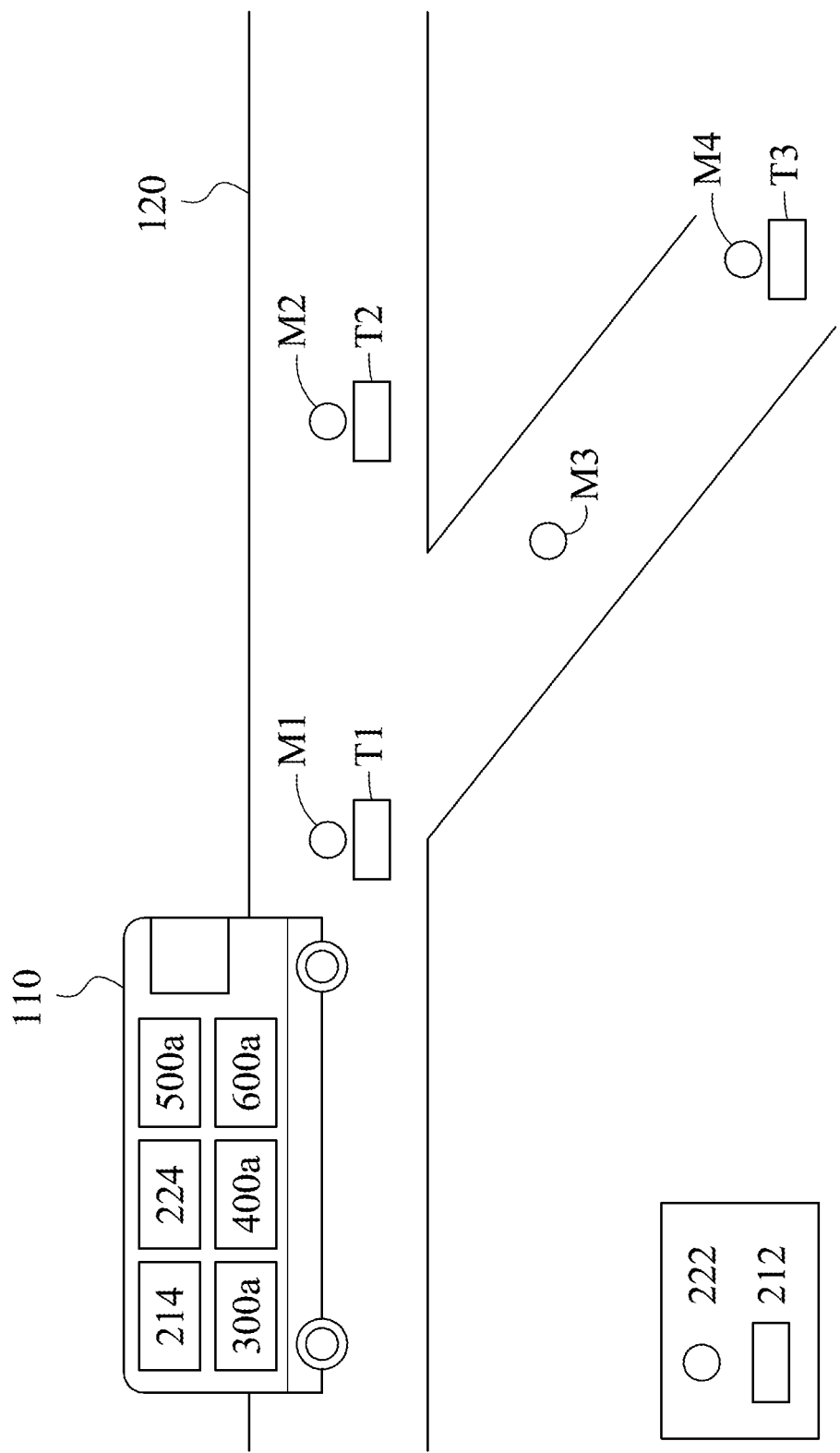
FIG. 4 shows a schematic view of the deciding system for moving the vehicle on the virtual rail of FIG. 3 applied to the vehicle and a road.
Figure 5:
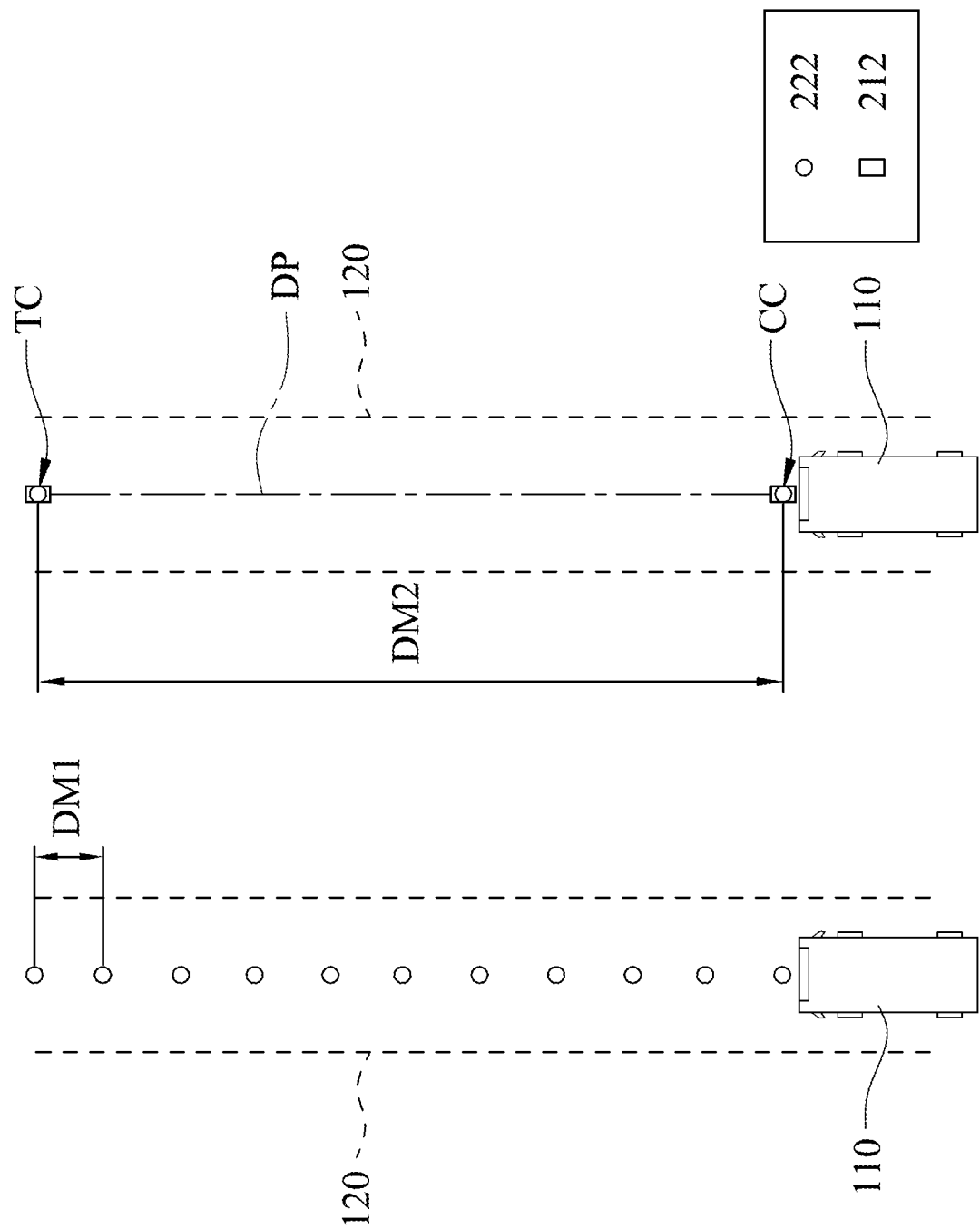
FIG. 5 shows a schematic view of a comparison between a first magnetic nail space and a second magnetic nail space.
Figure 6:
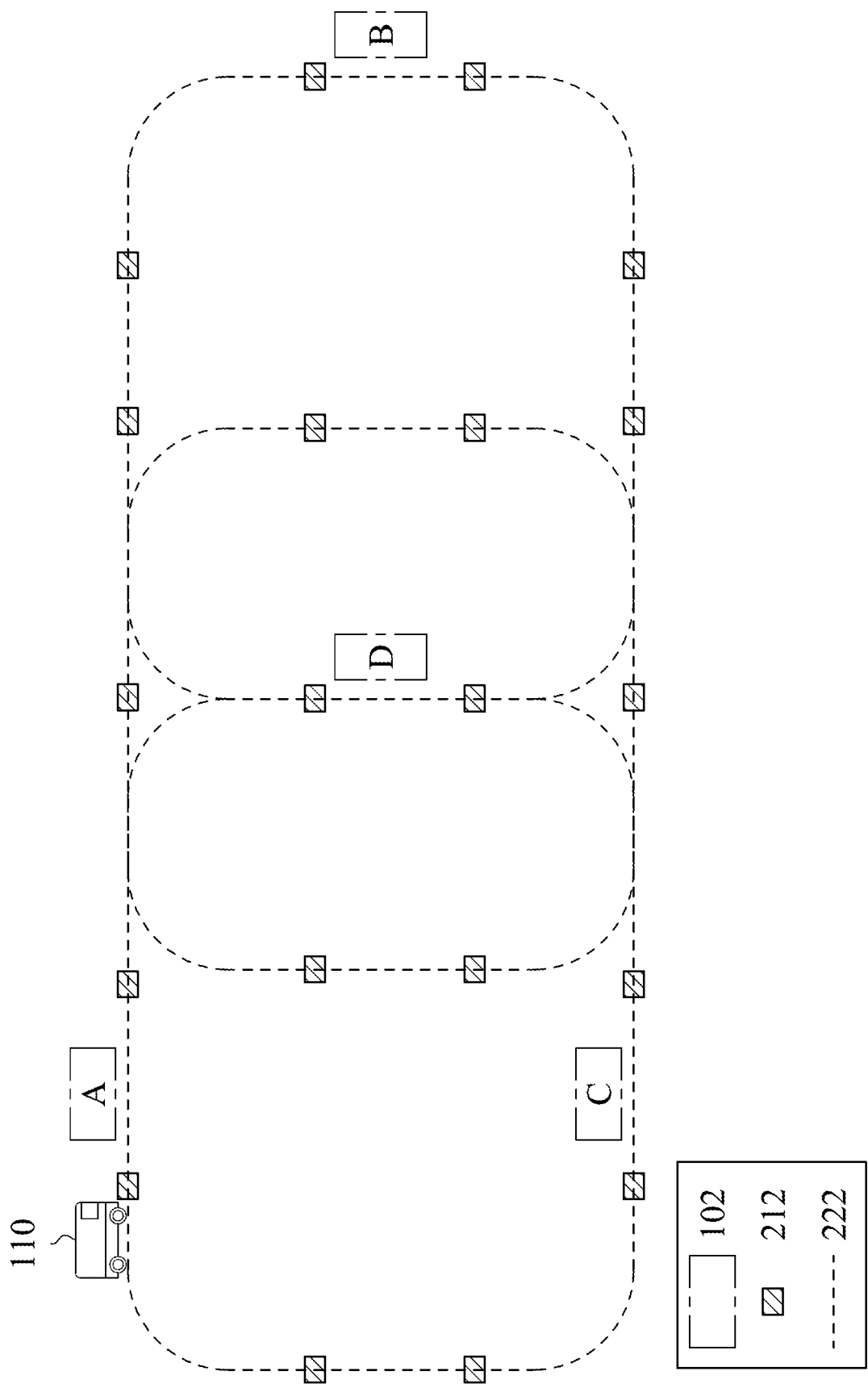
FIG. 6 shows a schematic view of the deciding system for moving the vehicle on the virtual rail of FIG. 3 applied to the vehicle and a stop station.
Figure 7:
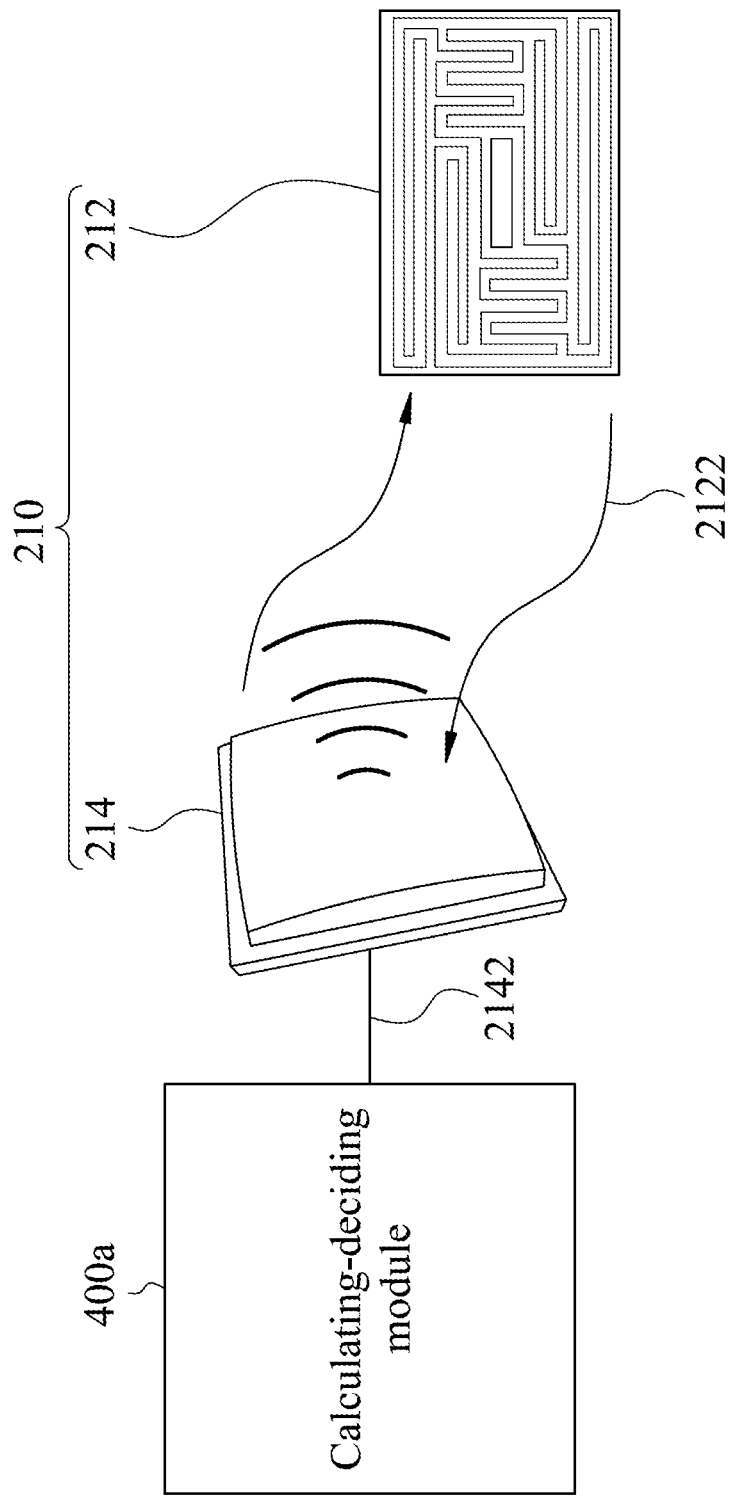
FIG. 7 shows a schematic view of a wireless tag device and a calculating-deciding module of the present disclosure.

Reference is made to FIGS. 3, 4, 5, 6 and 7. FIG. 3 shows a schematic view of a deciding system 100a for moving a vehicle 110 on a virtual rail according to a third embodiment of the present disclosure. FIG. 4 shows a schematic view of the deciding system 100a for moving the vehicle 110 on the virtual rail of FIG. 3 applied to the vehicle 110 and a road 120. FIG. 5 shows a schematic view of a comparison between a first magnetic nail space DM1 and a second magnetic nail space DM2. FIG. 6 shows a schematic view of the deciding system 100a for moving the vehicle 110 on the virtual rail of FIG. 3 applied to the vehicle 110 and a stop station 102. FIG. 7 shows a schematic view of a wireless tag device 210 and a calculating-deciding module 400a of the present disclosure. The deciding system 100a for moving the vehicle 110 on the virtual rail is configured to decide a moving trajectory of the vehicle 110 on a road 120, and includes a positioning module 200a, a vehicle dynamic detecting module 300a, a calculating-deciding module 400a, a sensing module 500a and a vehicle control module 600a. The vehicle dynamic detecting module 300a is signally connected to the positioning module 200a. The calculating-deciding module 400a is signally connected to the positioning module 200a, the vehicle dynamic detecting module 300a, the sensing module 500a and the vehicle control module 600a.

The positioning module 200a includes a wireless tag device 210, a magnetic device 220 and a high-precision map data 230. The wireless tag device 210 is configured to generate a tag message 2142. The magnetic device 220 is configured to generate a magnetic sensing message. The high-precision map data 230 is the map data with high precision. In detail, the wireless tag device 210 includes a plurality of wireless tags 212 and a wireless receiving device 214. The wireless tags 212 are disposed on the road 120 and transmit a plurality of tag signals 2122. The wireless receiving device 214 is disposed on the vehicle 110 and receives one of the tag signals 2122 to generate the tag message 2142. The tag message 2142 includes a current coordinate CC, a target coordinate TC and a driving path DP. The current coordinate CC represents a coordinate position where a current wireless tag 212 is located. The target coordinate TC represents a coordinate position where a next wireless tag 212 is located, and the vehicle 110 wants to travel from the current wireless tag 212 to the next wireless tag 212. The driving path DP is formed between the current coordinate CC and the target coordinate TC. The calculating-deciding module 400a drives the vehicle 110 to move from the current coordinate CC to the target coordinate TC according to the driving path DP. In one embodiment, the wireless tag device 210 can be a radio-frequency identification (RFID) device. The wireless tag 212 can be a RFID tag. The wireless receiving device 214 can be a reader corresponding to the wireless tag 212, but the present disclosure is not limited thereto. In addition, in response to determining that the vehicle 110 passes through one of the wireless tags 212, the wireless receiving device 214 senses the one of the wireless tags 212, and the calculating-deciding module 400a receives the tag message 2142 via the wireless receiving device 214, so that the vehicle 110 obtains the current coordinate CC, the target coordinate TC and the driving path DP.

The magnetic device 220 includes at least one magnetic apparatus 222 and a magnetic receiving device 224. The at least one magnetic apparatus 222 is disposed on the road 120 and transmit a magnetic signal. The magnetic receiving device 224 is disposed on the vehicle 110 and receives the magnetic signal to generate the magnetic sensing message. In one embodiment, the at least one magnetic apparatus 222 may be a magnetic nail, and the number of the at least one magnetic apparatus 222 is plural. The magnetic apparatuses 222 are disposed on the road 120 and spaced apart from each other. The magnetic apparatuses 222 transmit a plurality of the magnetic signals. The magnetic receiving device 224 may be a magnetic rod, and receives one of the magnetic signals to generate the magnetic sensing message, but the present disclosure is not limited thereto. In addition, in response to determining that the vehicle 110 passes through one of the magnetic nails, the magnetic rod senses the one of the magnetic nails to generate the magnetic sensing message corresponding to the one of the magnetic nails, thereby enabling the calculating-deciding module 400a to calculate the deviation value between the magnetic sensing message and the vehicle dynamic message.

The vehicle dynamic detecting module 300a is disposed on the vehicle 110 and configured to generate a vehicle dynamic message corresponding to the vehicle 110. The vehicle dynamic detecting module 300a may include various vehicle dynamic sensors. Specifically, the vehicle dynamic detecting module 300a includes an inertial element 310 and a speedometer 320. The inertial element 310 is disposed on the vehicle 110 and senses the vehicle 110 to generate the vehicle dynamic message (i.e., a vehicle parameter 312) corresponding to the vehicle 110. The inertial element 310 may be an inertial measurement unit (IMU). The speedometer 320 is also disposed on the vehicle 110, and is configured to obtain a vehicle speed 322 of the vehicle 110. In addition, the vehicle dynamic detecting module 300a can perform a trajectory prediction 330. The trajectory prediction 330 includes combining the vehicle dynamic message, the vehicle speed 322 and vehicle kinematics to predict a moving path of the vehicle 110.

The calculating-deciding module 400a is disposed on the vehicle 110, and can perform a path selection 410, a perceptual fusion 420 and a trajectory decision 430. The path selection 410 includes selecting the driving path DP corresponding to the vehicle 110 according to the tag message 2142. The perceptual fusion 420 includes fusing of sensing messages of various sensors of the sensing module 500a. The trajectory decision 430 includes deciding the moving trajectory of the vehicle 110 according to the tag message 2142 and the deviation value.

The sensing module 500a is disposed on the vehicle 110, and includes a radar 510, a camera 520 and a lidar 530. The radar 510, the camera 520 and the lidar 530 are all configured to sense an environment around the vehicle 110.

The vehicle control module 600a is disposed on the vehicle 110, and includes a steering wheel/throttle 610. The steering wheel/throttle 610 includes a steering wheel and a throttle, and is configured to control movement of the vehicle 110 according to the driving path DP. Furthermore, the vehicle control module 600a can perform a route change 620 and a station entry/exit 630. The route change 620 includes changing the driving path DP according to a demand message. The station entry/exit 630 includes controlling entry or exit of the vehicle 110 according to the driving path DP.

In FIG. 4, there are a first wireless tag T1, a second wireless tag T2, a third wireless tag T3, a first magnetic nail M1, a second magnetic nail M2, a third magnetic nail M3 and a fourth magnetic nail M4 disposed on the road 120. The first wireless tag T1 is at the same position as the first magnetic nail M1. The second wireless tag T2 is at the same position as the second magnetic nail M2. The third wireless tag T3 is at the same position as the fourth magnetic nail M4. The third magnetic nail M3 is located between the first magnetic nail M1 and the fourth magnetic nail M4.

When the vehicle 110 passes through the first wireless tag T1 and the first magnetic nail M1, the calculating-deciding module 400a of the vehicle 110 receives a message provided by the first wireless tag T1, and correspondingly compares the message to a database of the vehicle 110 to obtain the map data of the current coordinate CC and a next coordinate (a coordinate of the second wireless tag T2) and the driving path DP. Then, the calculating-deciding module 400a decides the vehicle 110 to move to a next tag (the second wireless tag T2) according to the driving path DP (original path).

At the same time, if there is a passenger on the vehicle 110 who wants to go to a destination of the third wireless tag T3, the calculating-deciding module 400a will confirm whether a demand message is received to generate a demand confirmation result, and decide whether to change the tag message 2142 according to the demand confirmation result. In response to determining that the demand confirmation result is yes, the calculating-deciding module 400a changes the tag message 2142 into another tag message, and decides the moving trajectory of the vehicle 110 according to the another tag message and the deviation value. In other words, in response to determining that the demand confirmation result is yes, the calculating-deciding module 400a modifies the driving path DP (original path) into another driving path DP (modified path) leading to the third wireless tag T3. In addition, when the vehicle 110 passes through the third magnetic nail M3, the calculating-deciding module 400a confirms whether the vehicle 110 has currently deviated from the another driving path DP leading to the third wireless tag T3. If the vehicle 110 has currently deviated from the another driving path DP, the calculating-deciding module 400a adjusts the moving trajectory of the vehicle 110 until the vehicle 110 receives messages provided by the fourth magnetic nail M4 and the third wireless tag T3. The vehicle 110 eventually arrives at the position designated by the passenger (i.e., the position of the third wireless tag T3). Therefore, the vehicle 110 can change the driving path DP according to the currently received messages combined with the demand confirmation result from the passenger, thereby greatly increasing the flexibility of the driving path DP of an autonomous public transportation vehicle (i.e., the vehicle 110) and then improving the transportation efficiency of the vehicle 110.

According to the another driving path DP formed between the first wireless tag T1 and the third wireless tag T3, there is a magnetic nail space between adjacent two of the magnetic nails (e.g., "the first magnetic nail M1 and the third magnetic nail M3" or "the third magnetic nail M3 and the fourth magnetic nail M4"), and there is a tag space between adjacent two of the wireless tags 212 (e.g., the first wireless tag T1 and the third wireless tag T3). The magnetic nail space is smaller than the tag space.

In FIG. 5, each of the first magnetic nail space DM1 and the second magnetic nail space DM2 represents a space between adjacent two of the magnetic nails. The first magnetic nail space DM1 may be 1 m, and the second magnetic nail space DM2 may be 10 m. The deciding system 100a for moving the vehicle 110 on the virtual rail of the present disclosure can change the laying of the magnetic nails with the first magnetic nail space DM1 to the laying of the magnetic nails with the second magnetic nail space DM2. When the magnetic nail space becomes larger, the vehicle 110 can be moved along the driving path DP under the condition of allowable deviation value according to the trajectory prediction 330 and control, thereby effectively reducing the cost of the laying of the magnetic nails on the virtual rail.

In FIG. 6, a plurality of the wireless tags 212 and a plurality of the magnetic apparatuses 222 are laid on the ground. The vehicle 110 can stop at one of a plurality of the stop stations 102 (the stop stations 102 include stops A, B, C, D), and travel along a fixed path according to a map data, such as cycle of "stop A→stop D→stop C" or "stop A→stop B→stop C", where "stop A→stop D" represents moving from the stop A to the stop D, and so on. When the vehicle 110 passes through anyone of the wireless tags 212 during movement, the vehicle 110 can obtain the coordinate of the current vehicle 110 (i.e., the current coordinate CC), and move to a next stop according to an established map data. Table 1 lists examples of a direction and a target of the vehicle 110 moved between two of the stop stations 102 in FIG. 6, and represents initial paths originally set by the system at each of the stop stations 102 (the directionality can be obtained from tag sequences when entering the stop stations 102). "CW" and "CCW" represent a clockwise direction and a counterclockwise direction, respectively.

trajectory of the vehicle 110 on a road 120. The deciding method S2 for moving the vehicle 110 on the virtual rail includes performing a magnetic sensing step S22, a sensing-calculating step S23, a deciding step S284 and a target confirming step S29. The following steps are described based on the deciding system 100a for moving the vehicle 110 on the virtual rail.

The magnetic sensing step S22 is "Is magnetic nail detected?", and includes configuring a magnetic receiving device 224 of a magnetic device 220 to sense at least one magnetic apparatus 222 to generate a magnetic sensing message. If the magnetic nail is detected, the sensing-calculating step S23 is performed. On the contrary, if the magnetic nail is not detected, the deciding step S284 is performed. In detail, in the magnetic sensing step S22, the number of the at least one magnetic apparatus 222 is plural. The magnetic apparatuses 222 are disposed on the road 120 and spaced apart from each other, and the magnetic apparatuses 222 transmit a plurality of magnetic signals. The magnetic receiving device 224 receives one of the magnetic signals to generate the magnetic sensing message. In response to determining that the vehicle 110 passes through one of the magnetic apparatuses 222, the magnetic receiving device 224 senses the one of the magnetic apparatuses 222 to generate the magnetic sensing message corresponding to the one of the magnetic apparatuses 222, thereby enabling a calculating-deciding module 400a to calculate a deviation value between the magnetic sensing message and a vehicle dynamic message.

The sensing-calculating step S23 is "Performing sensing and calculating", and includes performing a tag sensing step S24, a vehicle dynamic sensing step S26 and a calculating step S282. The tag sensing step S24 includes configuring a wireless receiving device 214 of a wireless tag device 210 to sense at least one wireless tag 212 to generate a tag message 2142. In detail, in the tag sensing step S24, the number of the

TABLE 1

| Direction | Target | Direction | Target | Direction | Target | Direction | Target |
| --- | --- | --- | --- | --- | --- | --- | --- |
| CW | A->D | CW | B->C | CW | C->A | CW | D->C |
| CW | A->B | CW | B->D | CCW | C->B | CW | D->B |
| CCW | A->C | CCW | B->A | CCW | C->D | CCW | D->B |
|  |  | CCW | B->D |  |  | CCW | D->A |

In FIG. 7, the wireless tag device 210 includes a wireless tag 212 and a wireless receiving device 214. The wireless receiving device 214 receives the tag signal 2122 from the wireless tag 212. The calculating-deciding module 400a is signally connected to the wireless receiving device 214 for receiving the tag message 2142. Therefore, the present disclosure utilizes the characteristics of wireless radio frequency tags (the characteristics may include the ability to read a large amount of data, long distance, read/write capabilities and no need of additional batteries) to enable the wireless tag device 210 to interact with other related hardware, thereby obtaining the position of the current vehicle 110 and moving the vehicle 110 to the next stop according to the established map data.

Figure 8:
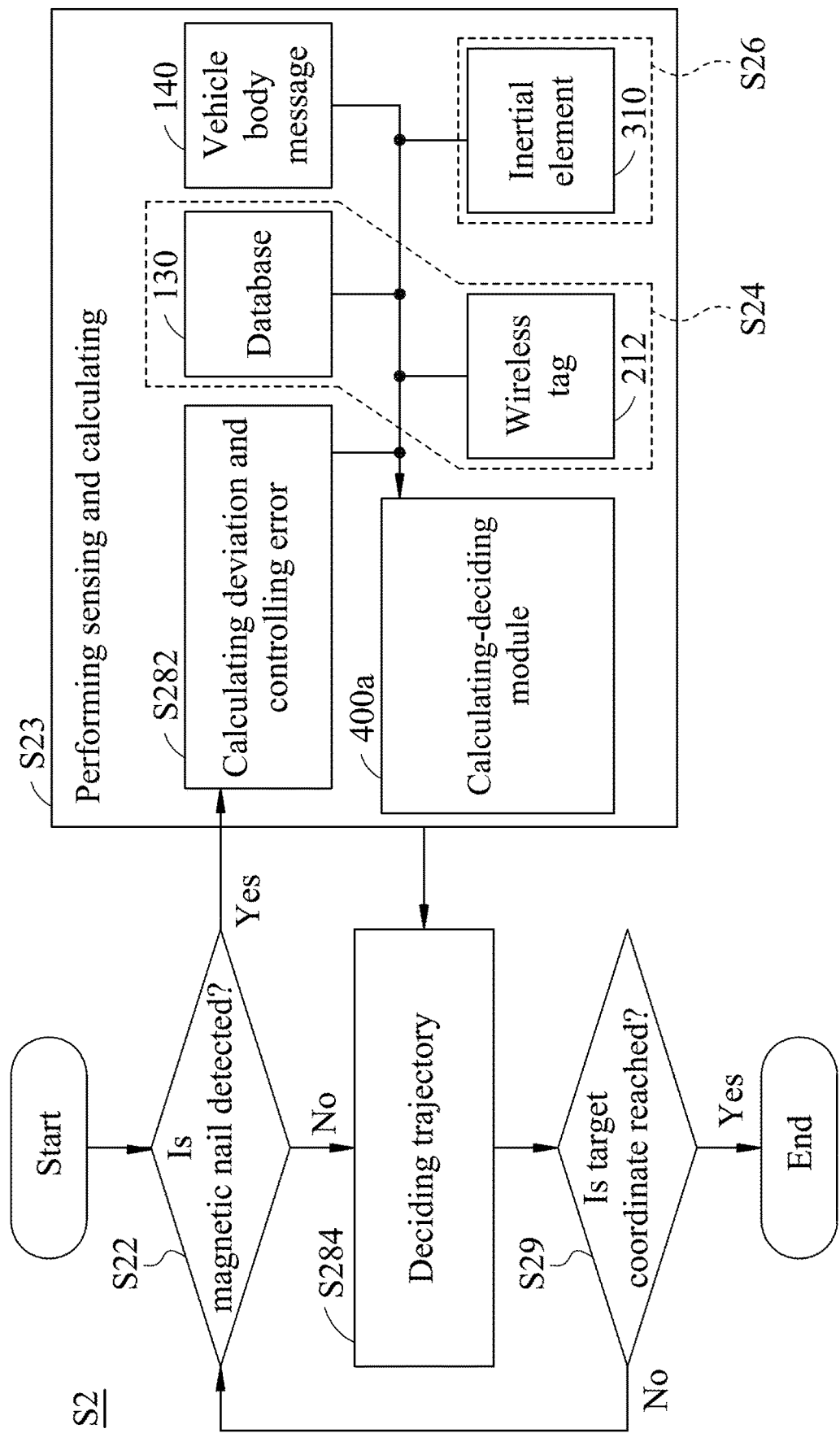
FIG. 8 shows a flow chart of a deciding method for moving a vehicle on a virtual rail according to a fourth embodiment of the present disclosure.

Reference is made to FIGS. 1, 3, 4, 5, 7 and 8. FIG. 8 shows a flow chart of a deciding method S2 for moving a vehicle 110 on a virtual rail according to a fourth embodiment of the present disclosure. The deciding method S2 for moving the vehicle 110 on the virtual rail may be applied to the deciding systems 100, 100a for moving the vehicle 110 on the virtual rail, and configured to decide a moving at least one wireless tag 212 is plural. The wireless tags 212 transmit a plurality of tag signals 2122. The wireless receiving device 214 receives one of the tag signals 2122 to generate the tag message 2142. The tag message 2142 includes a current coordinate CC, a target coordinate TC and a driving path DP. The driving path DP is formed between the current coordinate CC and the target coordinate TC, and the calculating-deciding module 400a drives the vehicle 110 to move from the current coordinate CC to the target coordinate TC according to the driving path DP. In response to determining that the vehicle 110 passes through one of the wireless tags 212, the wireless receiving device 214 senses the one of the wireless tags 212, and the calculating-deciding module 400a receives the tag message 2142 via the wireless receiving device 214, so that the vehicle 110 obtains the current coordinate CC, the target coordinate TC and the driving path DP. In other words, in response to determining that the vehicle 110 passes through the one of the wireless tags 212, the calculating-deciding module 400a of the vehicle 110 receives a message provided by the one of the wireless tags 212, and correspondingly compares the message to a database 130 of the vehicle 110 to obtain the map data of the current coordinate CC and a next coordinate and the driving path DP.

The vehicle dynamic sensing step S26 includes configuring an inertial element 310 of a vehicle dynamic detecting module 300a to sense the vehicle 110 to generate the vehicle dynamic message corresponding to the vehicle 110. The calculating step S282 is "Calculating deviation and controlling error", and includes configuring the calculating-deciding module 400a to calculate the deviation value between the magnetic sensing message and the vehicle dynamic message. The deviation value is smaller than or equal to a predetermined deviation threshold value, and a space between adjacent two of the magnetic apparatuses 222 is determined according to the deviation value. In the sensing-calculating step S23, the calculating-deciding module 400a can receive the tag message 2142, a vehicle body message 140, the vehicle dynamic message, the map data of the current coordinate CC and the next coordinate (the target coordinate TC), the driving path DP and the deviation value for using in subsequent steps.

The deciding step S284 is "Deciding trajectory", and includes configuring the calculating-deciding module 400a to decide the moving trajectory of the vehicle 110 according to the tag message 2142 and the deviation value. The combination of the calculating step S282 and the deciding step S284 can be regarded as the calculating-deciding step S08 in FIG. 2.

The target confirming step S29 is "Is target coordinate reached?", and includes configuring the calculating-deciding module 400a to confirm whether the vehicle 110 reaches the target coordinate TC. If the vehicle 110 reaches the target coordinate TC, ending the execution of the steps in the deciding method S2. On the contrary, if the vehicle 110 does not reach the target coordinate TC, repeatedly performing the magnetic sensing step S22.

Therefore, the deciding system 100a and the deciding method S2 for moving the vehicle 110 on the virtual rail of the present disclosure can perform tracking control via a distance estimation between tags, a magnetic nail navigation correcting method and a trajectory prediction 330, thereby effectively correcting a yaw condition during traveling so as to achieve controllable tracking and reducing the number of magnetic nails and the cost of laying the magnetic nails.

Figure 9:
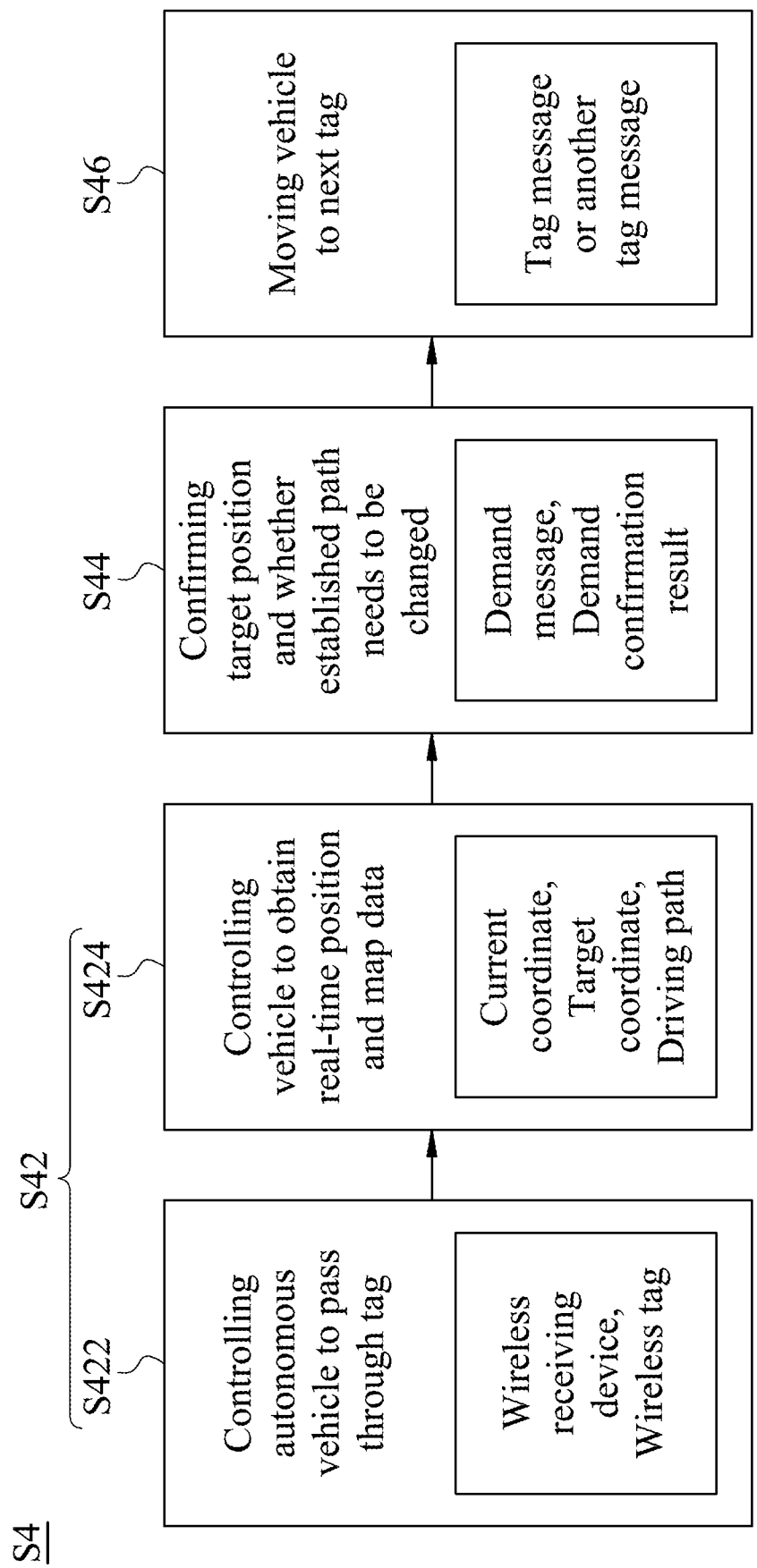
FIG. 9 shows a flow chart of a deciding method for moving a vehicle on a virtual rail according to a fifth embodiment of the present disclosure.

Reference is made to FIGS. 1, 3, 4, 5, 7 and 9. FIG. 9 shows a flow chart of a deciding method S4 for moving a vehicle 110 on a virtual rail according to a fifth embodiment of the present disclosure. The deciding method S4 for moving the vehicle 110 on the virtual rail may be applied to the deciding systems 100, 100a for moving the vehicle 110 on the virtual rail, and configured to decide a moving trajectory of the vehicle 110 on a road 120. The deciding method S4 for moving the vehicle 110 on the virtual rail includes performing a tag sensing step S42, a calculating-deciding step S44 and a vehicle controlling step S46. The following steps are described based on the deciding system 100a for moving the vehicle 110 on the virtual rail.

The tag sensing step S42 includes steps S422, S424. The step S422 is "Controlling autonomous vehicle to pass through tag", and includes configuring the calculating-deciding module 400a and the vehicle control module 600a to control the vehicle 110 to pass through the wireless tag 212. The step S424 is "Controlling vehicle to obtain real-time position and map data", and includes configuring the calculating-deciding module 400a to receive the tag message 2142 via the wireless receiving device 214, so that the vehicle 110 obtains the current coordinate CC, the target coordinate TC and the driving path DP.

The calculating-deciding step S44 is "Confirming target position and whether established path needs to be changed", and includes configuring the calculating-deciding module 400a to calculate the deviation value between the magnetic sensing message and the vehicle dynamic message, and decide the moving trajectory of the vehicle 110 according to the tag message 2142 and the deviation value. The calculating-deciding step S44 further includes configuring the calculating-deciding module 400a to confirm whether a demand message is received to generate a demand confirmation result, and decide whether to change the tag message 2142 according to the demand confirmation result. In response to determining that the demand confirmation result is yes, the calculating-deciding module 400a changes the tag message 2142 into another tag message, and decides the moving trajectory of the vehicle 110 according to the another tag message and the deviation value. A target position represents the target coordinate TC.

The vehicle controlling step S46 is "Moving vehicle to next tag", and includes configuring the vehicle control module 600a to control movement of the vehicle 110 according to one of the tag message 2142 and the another tag message, so that the vehicle 110 moves to the target coordinate TC. The target coordinate TC corresponds to the one of the tag message 2142 and the another tag message.

Therefore, the deciding method S4 for moving the vehicle 110 on the virtual rail can enable an autonomous vehicle (i.e., the vehicle 110) to change the driving path DP according to the currently received messages combined with the demand confirmation result from the passenger, thereby greatly increasing the flexibility of the driving path DP of the autonomous vehicle and then improving the transportation efficiency of the autonomous vehicle.

Figure 11:
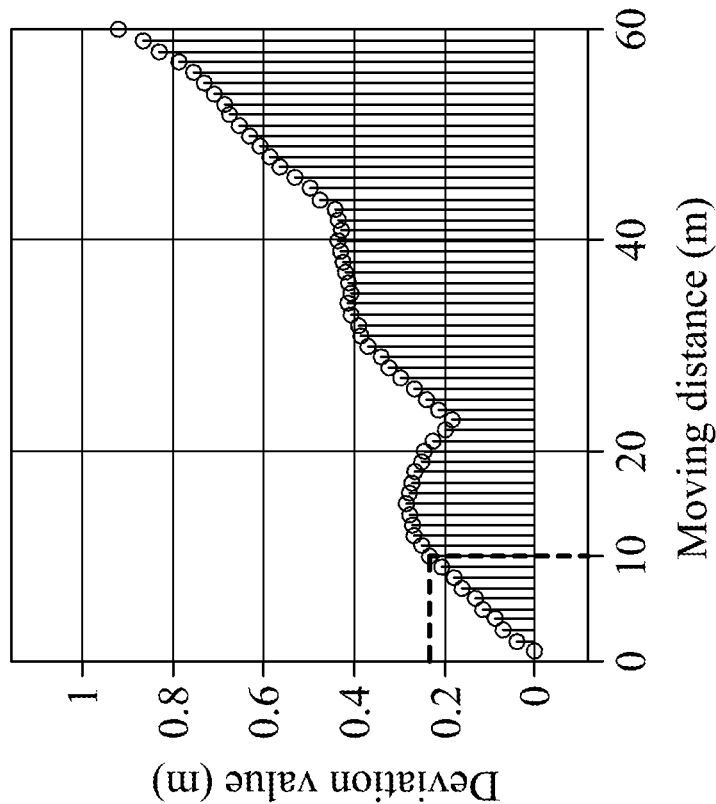
FIG. 11 shows a schematic view of a relationship between a moving distance and a deviation value between the driving path and the moving trajectory of FIG. 10.
Figure 10:
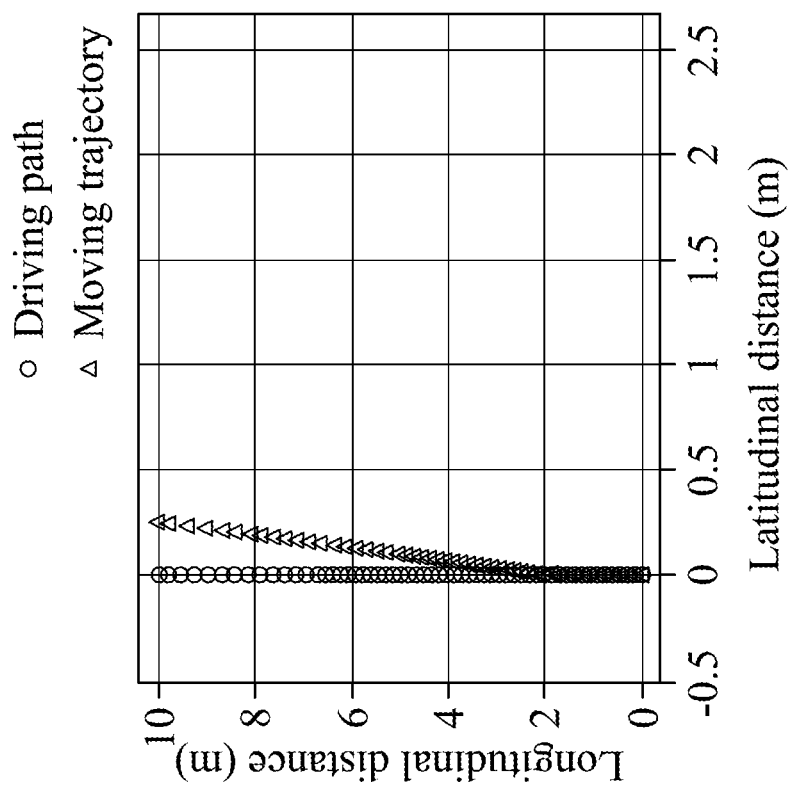
FIG. 10 shows a schematic view of a driving path and a moving trajectory of the vehicle on a straight road section of the present disclosure.
Figure 13:
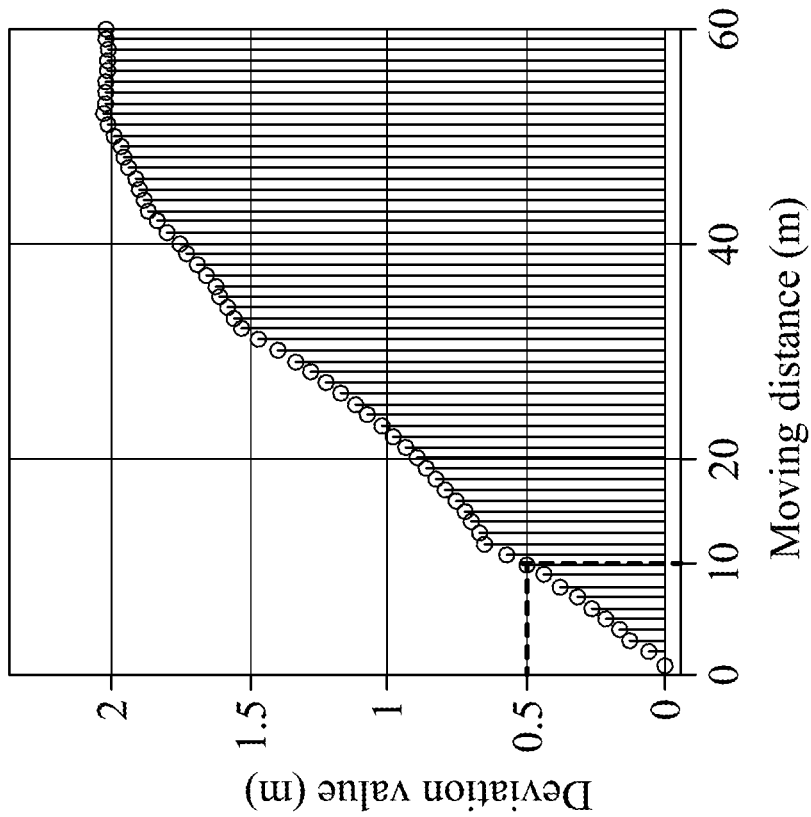
FIG. 13 shows a schematic view of a relationship between a moving distance and a deviation value between the driving path and the moving trajectory of FIG. 12.
Figure 12:
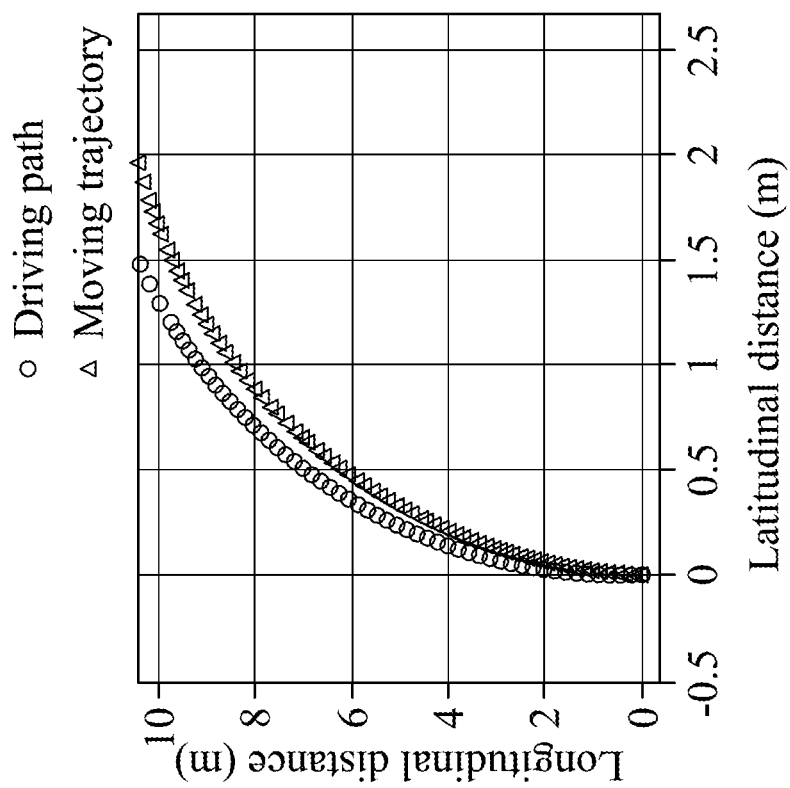
FIG. 12 shows a schematic view of a driving path and a moving trajectory of the vehicle on a curved road section of the present disclosure.

Reference is made to FIGS. 10, 11, 12 and 13. FIG. 10 shows a schematic view of a driving path and a moving trajectory of the vehicle 110 on a straight road section of the present disclosure. FIG. 11 shows a schematic view of a relationship between a moving distance and a deviation value between the driving path and the moving trajectory of FIG. 10. FIG. 12 shows a schematic view of a driving path and a moving trajectory of the vehicle 110 on a curved road section of the present disclosure. FIG. 13 shows a schematic view of a relationship between a moving distance and a deviation value between the driving path and the moving trajectory of FIG. 12. The driving path represents the path that the vehicle 110 wants to travel along. The driving path can be estimated by a predictive algorithm according to messages of Ackermann steering geometry and real time kinematic (RTK) longitude and latitude, an acceleration and a vehicle speed. The moving trajectory represents an actual trajectory of the vehicle 110. When the vehicle 110 is moved by a longitudinal distance, a deviation of a latitudinal distance between the driving path and the moving trajectory is generated. For example, if the magnetic nail space is increased from 1 m to 10 m before correcting the moving trajectory, it can be seen from the experimental results that there is the deviation value of 25 cm during traveling on the straight road section when the moving distance is 10 m. There is the deviation value of 50 cm during traveling on the curved road section when the moving distance is 10 m. If the allowable deviation value is 25 cm, the magnetic nail space on the straight road section may be set to 10 m, and the magnetic nail space on the curved road section may be set to 5 m, so that the vehicle 110 can effectively correct a yaw condition during traveling so as to achieve controllable tracking. Based on above, it can be seen that the deviation value is smaller than or equal to a predetermined deviation threshold value (an upper limit of the allowable deviation value). The magnetic nail space between adjacent two of the magnetic apparatuses 222 is determined according to the deviation value.

In one embodiment, the vehicle 110 may be a minibus. One of the calculating-deciding modules 400, 400a may be a processor, a microprocessor, an electronic control unit (ECU), a computer, a mobile device, a cloud processor or another computing processor. In addition, one of the calculating-deciding modules 400, 400a may include an on-board unit (OBU). The on board unit is disposed on the vehicle 110 and signally connected to the magnetic rod, the wireless receiving device 214 and the inertial element 310. The on board unit receives the magnetic sensing message, the tag message 2142 and the vehicle dynamic message. The on board unit calculates the deviation value between the magnetic sensing message and the vehicle dynamic message, and decides the moving trajectory of the vehicle 110 according to the tag message 2142 and the deviation value. However, the present disclosure is not limited thereto.

According to the aforementioned embodiments and examples, the advantages of the present disclosure are described as follows.

1. The deciding system and the deciding method for moving the vehicle on the virtual rail of the present disclosure can perform tracking control via a distance estimation between tags, a magnetic nail navigation correcting method and a trajectory prediction, thereby effectively correcting a yaw condition during traveling so as to achieve controllable tracking, and increasing the reliability and stability of control of the autonomous system and improving positioning error.

2. The deciding system and the deciding method for moving the vehicle on the virtual rail of the present disclosure can set an optimal magnetic nail space according to the allowable deviation value, thereby reducing the number of magnetic nails and the cost of laying the magnetic nails and solving a conventional problem of an excessively high cost of laying the magnetic nails.

3. The deciding system and the deciding method for moving the vehicle on the virtual rail of the present disclosure can change the driving path according to the currently received messages combined with the demand confirmation result from the passenger, thereby greatly increasing the flexibility of the driving path of an autonomous public transportation vehicle and then improving the transportation efficiency of the autonomous public transportation vehicle.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A deciding system for moving a vehicle on a virtual rail, which is configured to decide a moving trajectory of the vehicle on a road, and the deciding system for moving the vehicle on the virtual rail comprising:
   a positioning module, comprising:
      a wireless tag device configured to generate a tag message; and
      a magnetic device configured to generate a magnetic sensing message;
   a vehicle dynamic detecting module disposed on the vehicle and configured to generate a vehicle dynamic message corresponding to the vehicle; and
   a calculating-deciding module disposed on the vehicle and signally connected to the positioning module and the vehicle dynamic detecting module, wherein the calculating-deciding module receives the magnetic sensing message, the tag message and the vehicle dynamic message, and the calculating-deciding module calculates a deviation value between the magnetic sensing message and the vehicle dynamic message, and decides the moving trajectory of the vehicle according to the tag message and the deviation value;
   wherein the magnetic device comprises:
      a plurality of magnetic nails disposed on the road and spaced apart from each other, wherein the magnetic nails transmit a plurality of magnetic signals; and
      a magnetic rod disposed on the vehicle and receiving one of the magnetic signals to generate the magnetic sensing message;
   wherein in response to determining that the vehicle passes through one of the magnetic nails, the magnetic rod senses the one of the magnetic nails to generate the magnetic sensing message corresponding to the one of the magnetic nails, thereby enabling the calculating-deciding module to calculate the deviation value between the magnetic sensing message and the vehicle dynamic message;
   wherein the deviation value is smaller than or equal to a predetermined deviation threshold value, and a magnetic nail space between adjacent two of the magnetic nails is determined according to the deviation value.

2. The deciding system for moving the vehicle on the virtual rail of claim 1, wherein the wireless tag device comprises:
   a plurality of wireless tags disposed on the road and transmitting a plurality of tag signals; and
   a wireless receiving device disposed on the vehicle and receiving one of the tag signals to generate the tag message;
   wherein the tag message comprises a current coordinate, a target coordinate and a driving path, the driving path is formed between the current coordinate and the target coordinate, and the calculating-deciding module drives the vehicle to move from the current coordinate to the target coordinate according to the driving path.

3. The deciding system for moving the vehicle on the virtual rail of claim 2, wherein there is a magnetic nail space between adjacent two of the magnetic nails, there is a tag space between adjacent two of the wireless tags, and the magnetic nail space is smaller than the tag space.

4. The deciding system for moving the vehicle on the virtual rail of claim 2, wherein in response to determining that the vehicle passes through one of the wireless tags, the wireless receiving device senses the one of the wireless tags, and the calculating-deciding module receives the tag message via the wireless receiving device, so that the vehicle obtains the current coordinate, the target coordinate and the driving path.

5. The deciding system for moving the vehicle on the virtual rail of claim 2, wherein,
the vehicle dynamic detecting module comprises an inertial element disposed on the vehicle and sensing the vehicle to generate the vehicle dynamic message corresponding to the vehicle; and
the calculating-deciding module comprises an on board unit (OBU), wherein the on board unit is disposed on the vehicle and signally connected to the magnetic rod, the wireless receiving device and the inertial element, the on board unit receives the magnetic sensing message, the tag message and the vehicle dynamic message, and the on board unit calculates the deviation value between the magnetic sensing message and the vehicle dynamic message, and decides the moving trajectory of the vehicle according to the tag message and the deviation value.

6. The deciding system for moving the vehicle on the virtual rail of claim 1, wherein the calculating-deciding module confirms whether a demand message is received to generate a demand confirmation result, and decides whether to change the tag message according to the demand confirmation result;
wherein in response to determining that the demand confirmation result is yes, the calculating-deciding module changes the tag message into another tag message, and decides the moving trajectory of the vehicle according to the another tag message and the deviation value.

7. A deciding method for moving a vehicle on a virtual rail, which is configured to decide a moving trajectory of the vehicle on a road, and the deciding method for moving the vehicle on the virtual rail comprising:
performing a magnetic sensing step, wherein the magnetic sensing step comprises configuring a magnetic receiving device of a magnetic device to sense at least one magnetic apparatus to generate a magnetic sensing message;
performing a tag sensing step, wherein the tag sensing step comprises configuring a wireless receiving device of a wireless tag device to sense at least one wireless tag to generate a tag message;
performing a vehicle dynamic sensing step, wherein the vehicle dynamic sensing step comprises configuring a vehicle dynamic detecting module to sense the vehicle to generate a vehicle dynamic message corresponding to the vehicle; and
performing a calculating-deciding step, wherein the calculating-deciding step comprises configuring a calculating-deciding module to calculate a deviation value between the magnetic sensing message and the vehicle dynamic message, and decide the moving trajectory of the vehicle according to the tag message and the deviation value;
wherein the at least one wireless tag and the at least one magnetic apparatus are disposed on the road, and the wireless receiving device, the magnetic receiving device, the vehicle dynamic detecting module and the calculating-deciding module are disposed on the vehicle;
wherein in the magnetic sensing step,
a number of the at least one magnetic apparatus is plural, the magnetic apparatuses are disposed on the road and spaced apart from each other, and the magnetic apparatuses transmit a plurality of magnetic signals; and
the magnetic receiving device receives one of the magnetic signals to generate the magnetic sensing message;
wherein in the magnetic sensing step, in response to determining that the vehicle passes through one of the magnetic apparatuses, the magnetic receiving device senses the one of the magnetic apparatuses to generate the magnetic sensing message corresponding to the one of the magnetic apparatuses, thereby enabling the calculating-deciding module to calculate the deviation value between the magnetic sensing message and the vehicle dynamic message;
wherein the deviation value is smaller than or equal to a predetermined deviation threshold value, and a space between adjacent two of the magnetic apparatuses is determined according to the deviation value.

8. The deciding method for moving the vehicle on the virtual rail of claim 7, wherein in the tag sensing step, a number of the at least one wireless tag is plural, the wireless tags transmit a plurality of tag signals, the wireless receiving device receives one of the tag signals to generate the tag message, the tag message comprises a current coordinate, a target coordinate and a driving path, the driving path is formed between the current coordinate and the target coordinate, and the calculating-deciding module drives the vehicle to move from the current coordinate to the target coordinate according to the driving path.

9. The deciding method for moving the vehicle on the virtual rail of claim 8, wherein there is a space between adjacent two of the magnetic apparatuses, there is another space between adjacent two of the wireless tags, and the space is smaller than the another space.

10. The deciding method for moving the vehicle on the virtual rail of claim 8, wherein in the tag sensing step, in response to determining that the vehicle passes through one of the wireless tags, the wireless receiving device senses the one of the wireless tags, and the calculating-deciding module receives the tag message via the wireless receiving device, so that the vehicle obtains the current coordinate, the target coordinate and the driving path.

11. The deciding method for moving the vehicle on the virtual rail of claim 8, wherein,
in the vehicle dynamic sensing step, an inertial element of the vehicle dynamic detecting module senses the vehicle to generate the vehicle dynamic message corresponding to the vehicle; and
in the calculating-deciding step, an on board unit (OBU) of the calculating-deciding module calculates the deviation value between the magnetic sensing message and the vehicle dynamic message, and decides the moving trajectory of the vehicle according to the tag message and the deviation value.

12. The deciding method for moving the vehicle on the virtual rail of claim 7, wherein the calculating-deciding step further comprises:
configuring the calculating-deciding module to confirm whether a demand message is received to generate a demand confirmation result, and decide whether to change the tag message according to the demand confirmation result;
wherein in response to determining that the demand confirmation result is yes, the calculating-deciding module changes the tag message into another tag message, and decides the moving trajectory of the vehicle according to the another tag message and the deviation value.

* * * * *